United States Patent [19]
Bass

[11] 3,889,184
[45] June 10, 1975

[54] ELECTRONIC HAZARD TESTER FOR MEDICAL FACILITIES

[76] Inventor: John M. Bass, 13533 Larkin Dr., Minnetonka, Minn. 53343

[22] Filed: Mar. 25, 1974

[21] Appl. No.: 454,328

[52] U.S. Cl. ............ 324/62; 128/2.1 P; 128/2.1 Z; 324/73 R
[51] Int. Cl. ........................................... G01r 27/02
[58] Field of Search ................. 324/62, 51, 73 R; 128/2.1 Z, 2.1 P

[56] References Cited
UNITED STATES PATENTS

| | | | |
|---|---|---|---|
| 2,410,499 | 11/1946 | Hinsey et al. | 128/2.1 P |
| 3,508,540 | 4/1970 | Cavallari, Jr. et al. | 128/2.1 Z |
| 3,518,986 | 7/1970 | Woods et al. | 128/2.1 P |
| 3,605,728 | 9/1971 | Ogle | 128/2.1 P |
| 3,642,008 | 2/1972 | Bolduc | 324/62 R X |
| 3,699,432 | 10/1972 | Brown | 128/2.1 P |

Primary Examiner—Stanley T. Krawczewicz

[57] ABSTRACT

An improved electronic test instrument for accurately and safely measuring electrical parametric conditions which may be hazardous to a patient within an electrically susceptible patient location and for automatically warning of such detected hazardous conditions. The test instrument has a chassis adapted for convenient mounting within a wall of an electrically susceptible patient location and makes all measurements by means of a single sensing probe retractively storable in the chassis and extendable to all conductive surfaces within the location. The probe senses electrical parametric conditions of conductive surfaces throughout the location and provides electronic circuits within the chassis with the sensed information. Operational amplifier circuits within the chassis accurately measure current flow created by said sensed electrical conditions through an electrically simulated patient, and automatically provide a warning when a hazardous condition is detected. The current measurement circuits include unique cross-checking capabilities for insuring accurate and reliable measurements. The instrument is selectively operable to measure the integrity of receptacle grounds and grounded conductive surfaces within the location, as referenced to a patient ground, by means of a unique ohmmeter employing operational amplifier circuits. The ohmmeter performs all resistive measurements with the single probe at current levels which are entirely safe to an electrically susceptible patient.

14 Claims, 5 Drawing Figures

ELECTRONIC HAZARD TESTER FOR MEDICAL FACILITIES

DEFINITIONS

The meanings of the words as below defined will apply throughout the following discussion:

a. Electrically Susceptible Patient (ESP): is one who has an externalized catheter or electrode providing a direct conductive path to his heart. (Such conducive paths may include transvenous or intrathoracic wires for pacing or monitoring, fluid filled catheters, pressure transducers, esophageal electrodes and similar devices).

b. Electrically Susceptible Patient Location (ESPL): is any place where an electrically susceptible patient is located, including operating rooms, recovery rooms, catherization labs, special procedures rooms, emergency rooms, coronary care units, intensive care units, neo-natal units, and the like.

c. Extraneous Voltage: is an electrical potential that may be present on a conductive surface within an ESPL due to stray currents within the building structure.

d. Fault Condition: is a failure in an electrical system or appliance which gives rise to a fault current.

e. Fault Current: is an electric current caused through accidental connection to a live conductor resulting from a fault condition.

f. Ground Current: is that current which flows through a ground wire of an electrical apparatus.

g. Hazard: is any electrical condition that could cause human injury or death.

h. Leakage Current: is any electrical current, including capacitively coupled currents, not intended to be applied to a patient but which may be conveyed to the patient from accessible parts of an appliance to ground or to other accessible parts of the appliance.

i. Macroshock Current: is an electric current in the milliamp range (nominally 1.0 milliamps and greater) associated with a path through the body which originates and terminates externally of the body. (i.e., hand to hand).

j. Macroshock Limit: is a macroshock current of 5.0 milliamps or greater.

Microshock Current: is an electric current in the microamp range, and having a current path through the body which originates at or within the heart muscle and terminates external of the body.

l. Microshock Hazard: is an electrical condition within an ESPL which can create a microshock current of 10 microamps or greater through an electrically susceptible patient.

m. Patient Ground: is a heavey copper buss ground line extending within an ESPL to which all electrical equipment and conductive surfaces within the ESPL are connected.

n. Ventricular Fibrillation: is an uncoordinated reaction of the heart muscle in which the heart's pumping action is lost.

BACKGROUND OF THE INVENTION

Field of the Invention

This invention relates generally to electrical test equipment and more specifically to an electronic test instrument for measuring and warning of hazardous electrical conditions within an electrically susceptible patient location.

Description of the Prior Art

The technological advances of today's society, accompanied by a phenomenal development in electronic components and instrumentation has had a pronounced effect upon the methods and techniques used in the diagnosis, treatment and care of patients within medical facilities. Use of state-of-the-art electronic equipment within medical facilities has reached unprecedented levels. Rapid technological take-over of any industry or field, however, is never achieved without accompanying problems and risks; and the electronification of the medical industry has been no exception.

Manufacturers who were called upon to supply the medical industry with electronic test equipment were initially faced with a two-fold problem. First, it was found that those basic design and construction techniques which were perfectly acceptable for non-medical commercial applications, were partially or totally unacceptable for general use in the medical industry. For example, a unit of test equipment which had been designed primarily for checking and troubleshooting electronic systems within, say the aerospace industry, was not in general designed for minimization of ground return paths or the production of chassis or extraneous voltages which, in a medical facility, could be fatal to an electrically susceptible patient (ESP). Secondly, there were no national standards to which equipment designed specifically for use in the medical industry could be built — partly because those using the equipment were not aware of its potential hazards to a patient, and partly because of dissention among those skilled in the art and aware of the problems, as to what electrical parameters and conditions did in fact present hazards.

These definitional problems, have been relieved to some extent today by standards for medical facilities and equipment as set forth in the National Electrical Code and by means of research programs into such problem areas, of which the "Ellerbe Report on Electrical Hazards Within Medical Facilities," published by the Ellerbe Architects, St. Paul, Minn., is typical. As a result of such studies, it is generally agreed today that electrical currents in the microamp range can be lethal to an ESP, and that such potential "microshock" hazards exist at all electrically susceptible patient locations (ESPLs) where there is a patient being treated with an externalized electric conductor such as a probe, catheter or other electrode connected to the heart. It is also now generally recognized that under "fault" conditions of electrical equipment, the electrical parameter critical to generating a hazard to an ESP is ground impedence (i.e., the electrical resistance between the electronic equipment and the patient ground). The National Electrical Code specifies that under fault conditions, no conductive surface or objects within an ESPL should be capable of sustaining a potential difference of 5 millivolts measured across 500 ohms (the minimum ESP resistance) from the conductive surface to the patient ground. Further, it is now generally specified that under failure conditions, no unit of electrical equipment should be capable of generating a current of greater than 10 microamps through its ground lead or through any other lead of conductive surface accessible to an ESP or to someone who can touch that patient.

Due to potential hazardous interaction between various pieces of equipment and to idiosyncrasies inherent in their design, defining the electrical requirements for individual pieces of test equipment, and designing such equipment to satisfy those conditions, does not insure the removal of non-hazardous conditins within an ESPL. Test equipment specifically designed for measuring and detecting electrically hazardous conditions within the ESPL is required. Such hazard measurement equipment besides being capable of accurately measuring the required minute voltage and current levels, must itself be entirely safe for measuring electrical parametric conditions within the ESPL in the presence of an electrically susceptible patient, and further must be accurate, highly reliable, easy to operate and require little maintenance.

Hazard detectors per se are available in the prior art; however, they generally lack one or more of the requisite elements for the ideal device. Most of such prior art hazard detectors cannot adequately or accurately determine the resistance between a conducting surface and the patient ground within an ESPL, or determine ground impedance (or integrity) of ground conductors within the ESPL at non-hazardous current levels. The prior art hazard detectors are also generally inconvenient to use since they require two probes to make a measurement. Further, due to inaccuracies introduced into the measurement by reason of their probe impedence, nonportable equipment generally require post-measurement compensation for the inherent inaccuracies of the measurement. Further, the prior art test instruments for measuring hazardous conditions in general do not include proper circuit protection from inadvertent probe contact with a high voltage (110 volts) source, and those devices which do include such protection tend to lose that degree of accuracty required for making such measurements.

The present invention overcomes the above-mentioned shortcomings of the prior art hazard measurement devices. The hazard measurement and detector test instrument of the present invention provides a safe and highly reliable method of rapidly and accurately measuring and detecting hazardous microshock currents and for making qualitative accurate measurements of ground integrity at current levels entirely non-hazardous to an electrically susceptible patient within the ESPL. Further, all measurements are obtainable by means of a single convenient probe extendable throughout the ESPL.

SUMMARY OF THE INVENTION

The present invention comprises an electronic test instrument specifically designed for measuring electrical parametric conditions within an ESPL, which may create a hazard to an electrically susceptible patient therein, and which makes such measurements in a manner which is entirely non-hazardous to the electrically susceptible patient.

A chassis, specifically designed for operative mounting within a wall of the ESPL contains the electronic test circuits of the test instrument. A control panel of the chassis, bears a plurality of selector controls, displays a read-out meter having a plurality of scales for providing a visual numerical display of measured parameters, and includes a warning indicator for providing an alarm of a detected microshock current hazard condition. A single sensing probe and connecting cord are connected to and extendable from the chassis to all conductive surfaces within the ESPL, and are enclosed within the chassis when not in use.

The sensing probe and meter are operatively connected by means of a function select switch with: current measurement circuits, resistance measurement circuits, and hazard detector circuits. All of these electrical circuits are energized by a power supply which is referenced to a patient ground buss extending within the ESPL.

The probe senses the electrical parametric conditions of a conductive surface with which it is in electrical contact. When the current measurement circuits are selectively connected with the probe, the DC or AC current flow potentially available to an electrically susceptible patient is measured and is indicated on the meter. The current measurement circuits employ operational amplifier circuits to accurately measure current flow through a resistance which simulates an electrically susceptible patient, caused by a voltage potential difference between the probed surface and the patient ground. The current measurement circuits employ a unique feedback resistor switching configuration to provide error free cross-checking in the calibration of the current measurement circuits. The hazard detector circuits, also employing operational amplifiers, are simultaneously operative with the current measurement circuits for automatically energizing a hazard warning indicator on the instrument control panel whenever an AC current is sensed by the probe which exceeds the microshock current hazard level for an electrically susceptible patient.

The resistance measurement circuits of the instrument, when selectively connected with the probe, accurately measure the resistance between the probe and patient ground by using non-hazardous current levels. A current source supplies a predetermined amount of current to a junction which branchs off into first and second conductive paths to the patient ground. The first conductive path is of known predetermined resistance; and the second conductive path, which includes the probe, has a resistive value which varies directly with the resistance between the probed conductive surface and patient ground. An operational amplifier sensing circuit senses the change in voltage across the first conductive path resulting from the proportioning of the current source current between the first and second conductive paths as a result of changes in the resistive value of the probed conductive surfaces. That portion of the current source current which flows through the probe never exceeds the microshock current hazard level for an electrically susceptible patient.

All of the electronic circuits within the chassis are protected from severe overvoltage stressed in a manner which does not in any way detract from their accuracy or safety to the electrically susceptible patient. The amplifier circuits provide a signal to the meter which varies in proportion to the sensed voltage change. The resistance measuring input circuit is compensated for any given probe and associated connector resistance so as to enable resistance measurements which are independent of either the probe and cord resistance or length.

BRIEF DESCRIPTION OF THE DRAWING

Referring to the drawing, wherein like numerals represent like parts throughout the several views.

DESCRIPTION OF THE PREFERRED EMBODIMENT

Figure 1:
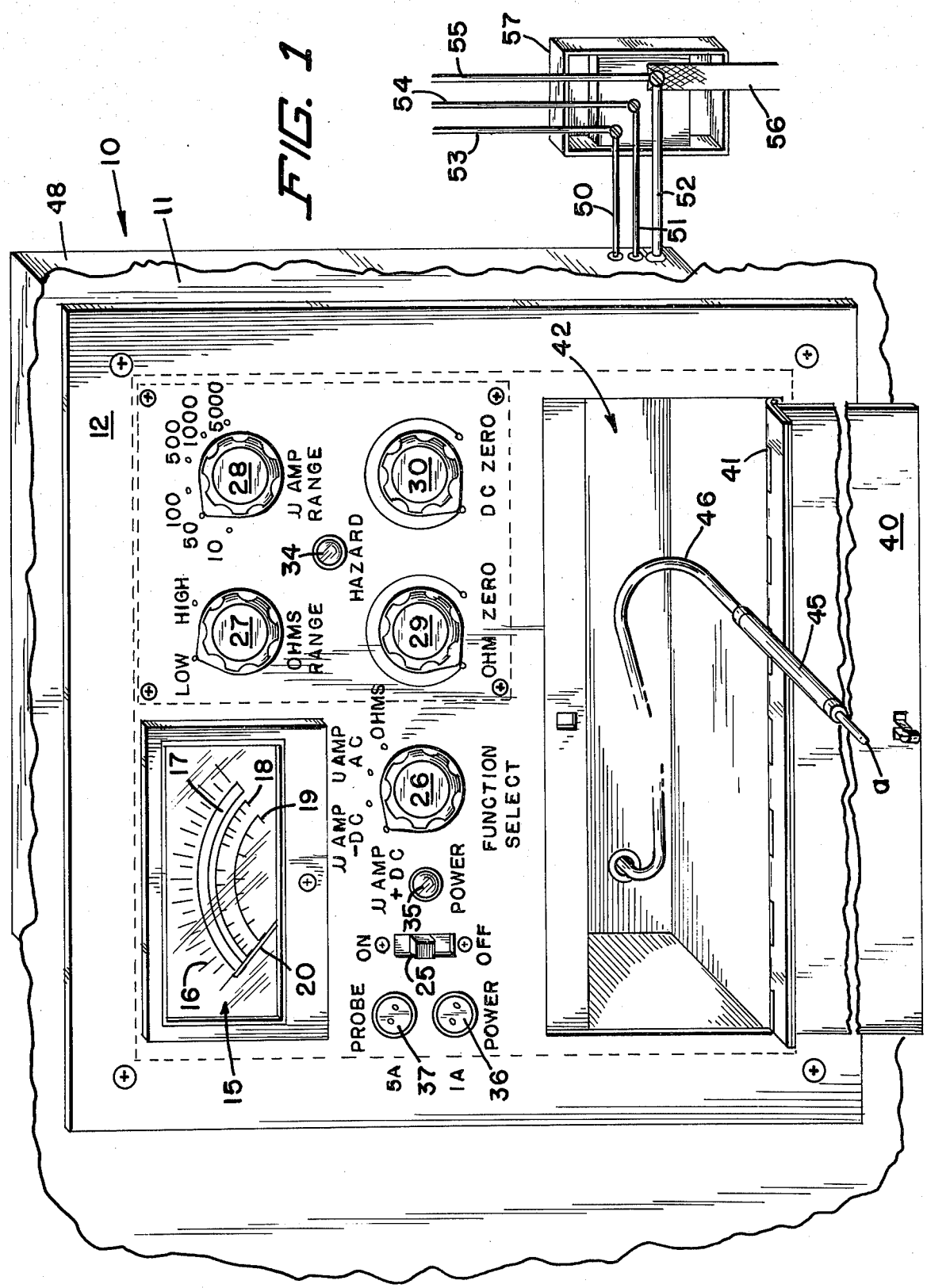
FIG. 1 is a diagrammatic view of a preferred embodiment of the test instrument of my invention illustrating the instrument chassis as installed and operatively connected in a wall of the ESPL.

Referring to the Figures, there is generally illustrated in FIG. 1 a chassis 10 of a preferred embodiment of the ESPL test instrument of my invention. The chassis 10, as illustrated, is embedded within a wall 11 of an ESPL wherein electrical parametric conditions are to be tested. In the preferred embodiment, the test instrument is "flush-mounted" in the wall 11 such that only a front instrument selector panel 12 projects therefrom.

The panel 12 generally includes a meter 15 having four scales extending thereacross: an upper scale 16; a reflecting mirror 17; a first lower scale 18; and a second lower scale 19. The upper scale 16 may be selectively employed for reading out two microamp ranges. The first and second lower scales 18 and 19 respectively are employed for reading out resistance measurements, as hereinafter described. A meter indicator 20 is operatively connected to a meter movement (not illustrated but hereinafter described) to indicate readings upon the scales 16, 18 and 19.

The chassis panel 12 has a plurality of switches and selection indicators mounted thereon and operatively connected to electrical circuits contained within the chassis 10, as hereinafter described. In general, the indicators and switches include an ON-OFF switch 25, a "function select" switch 26, an "ohm range" selector switch 27, a "current range" selector switch 28, an "ohm-zero" calibration switch 29 and a "DC zero" calibration selector switch 30.

The function select switch 26 is selectively operable among four positions designated on the panel 12 as "$\mu$ amp + DC," "$\mu$ amp − DC," "$\mu$ amp AC" and "ohms." The power switch 25 is selectively operable between an "ON" and an "OFF" positions. The ohm range selector switch 27 is selectively operable between a "LOW" and a "HIGH" positions. The current range selector switch 28 is selectively operable among six positions designated as "10," "50," "100," "500," "1,000" and "5,000." The ohm-zero and DC-zero select switches 29 and 30 respectively are of the continuous control type, being operatively connected to the sliders of potentiometers as hereinafter described, and having no predesignated selector positions.

Two indicator lights appear on the chassis panel 12; they are a "hazard" indicator light 34 and a "power" indicator light 35. A first fuse holder 36 and a second fuse holder 37 are positioned near the left of the chassis panel 12 and are respectively designated for accommodating 1 amp and 5-amp fuses to protect the electrical circuits to be hereinafter described.

A door 40 forms a part of the chassis selector panel 12 and is hinged thereto at 41. When in an open position, as illustrated, the door 40 enables access to an internal cavity 42 of the chassis 10. In the preferred embodiment, an electrical probe 45 having a single electrical contact (stylus) 45($a$) is connected by means of an electrical conductor cord 46 passing through a rear wall of the cavity 42 to electrical circuits of the testing apparatus as hereinafter described. The cavity 42 provides space for storage of the probe 45 and cord 46 therein when not in use. In the preferred embodiment, the cavity 42 in the chassis is sufficiently large to enable storage of a cord 46 which could exceed 50 feet in length. It should also be noted that a retractable "reel"-type apparatus within the cavity 42, for automatically retracting the cord and probe is also contemplated within the spirit and intent of my invention.

That portion of the chassis 10 enclosed within the wall and generally designated at 48 holds the electrical components of the ESPL test instrument. First, second and third conductor wires 50, 51 and 52 respectively, extend through the enclosed portion 48 of the chassis. The first and second conductors 50 and 51 respectively are respectively connected to a pair of AC "hot" lines (53 and 54) which supply power to the ESPL. The third conductor 52 is connected to an electrical 'ground' line 55 (third wire of the system). The ground line 55 is directly connected to a "patient ground" bus 56; the patient ground 56 is a reference bus bar which extends within the ESPL (not shown) and to which all electrical equipment and conductive surfaces within the ESPL are referenced. As illustrated in FIG. 1, the electrical connections among the conductors 50, 51 and 52 and the lines 53, 54 and 55 and the patient ground 56 are made within a junction box 57 within the wall 11.

Figure 2:
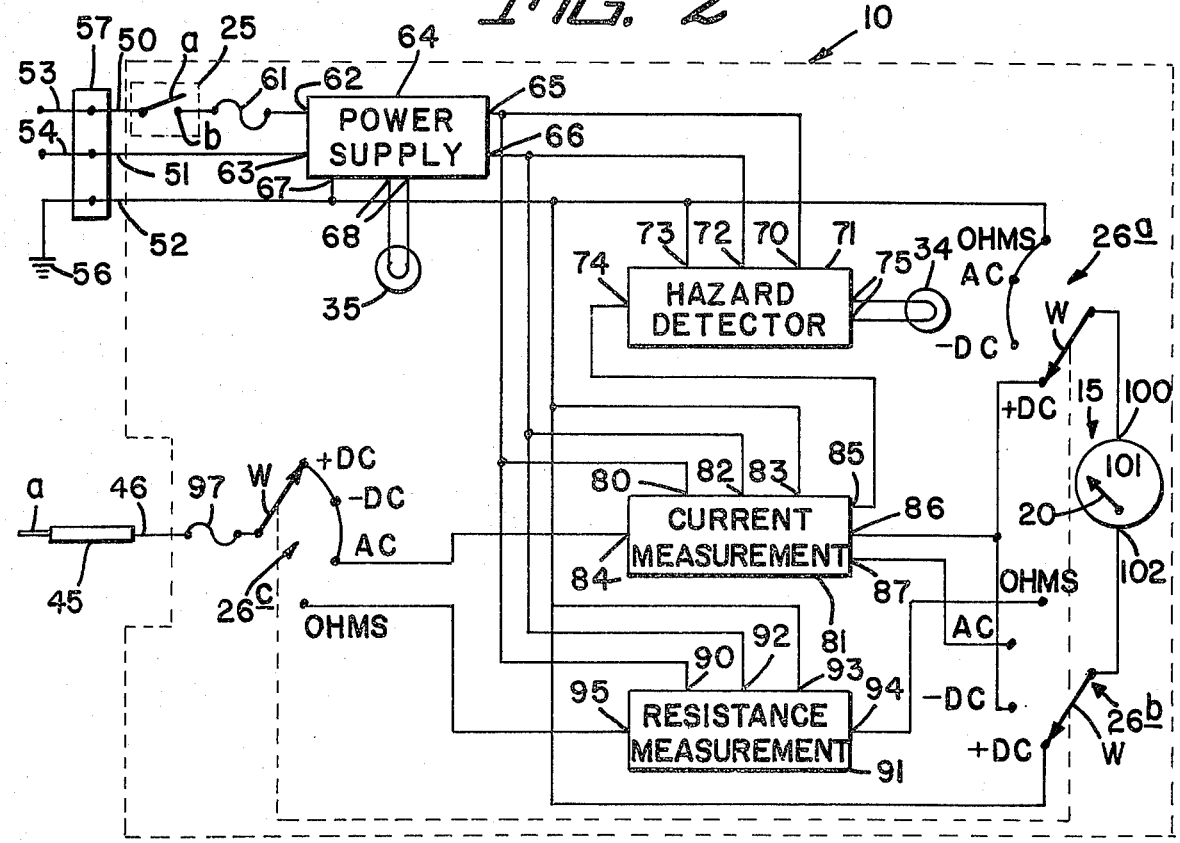
FIG. 2 is a block diagram representation of the functional electrical portions of my invention.

A functional block diagram representation of the electrical circuits of the preferred embodiment is illustrated in FIG. 2. Referring to FIG. 2, the patient ground is schematically illustrated by the conventional 'ground' potential signal at 56. The first power conductor 50 is directly connected to a movable contact 25($a$) of the power switch 25. The power switch 25 further has a stationary contact 25($b$) directly connected by means of a one amp fuse 61 to a first input terminal 62 of a power supply 64. The fuse 61 is mechanically inserted within the fuse enclosure 36 (FIG. 1) of the chassis 10 and provides the main fuse protection for the electrical circuits from the electrical supply lines providing power to the ESPL. The power supply 64 further has a second power input 63 directly connected to the second power input conductor 51, a first signal output 65, a second signal output 66, a common input terminal 67 and a pair of indicator outputs 68. The common input terminal 67 is directly connected to the common conductor 51. The indicator outputs 68 are directly operatively connected to energize the power indicator lamp 35.

The power supply 64 may be any conventional DC regulated power supply capable of converting AC power applied to its inputs (62 and 63) to two DC voltage potentials at its output terminals (65 and 66). In the preferred embodiment, the voltage levels of the DC signals appearing at the output terminals 65 and 66 respectively of the power supply 64 are +12 and −12 volts.

The first signal output 65 of the power supply 64 is directly connected to a first bias input 70 of a hazard detector functional block 71. The hazard detector 71 further has a second bias input 72 directly connected to the second signal output 66 of the power supply 64, a common input terminal 73 directly connected to the common conductor 52, a signal input 74 and a pair of indicator output terminals 75 operatively connected to energize the hazard indicator lamp 34.

The first power output 65 of the power supply 64 is also directly connected to a first bias input 80 of a current measurement functional block 81. The ammeter 81 further has a second bias input 82 directly connected to the second power output 66 of the power supply 64, a common input terminal 83 directly connected to the common conductor 52, a signal input 84, a first signal output 85 directly connected to the signal input 74 of the hazard detector 71, a second signal output 86 and a third signal output 87.

The first power output 65 of the power supply 64 is also directly connected to a first power input 90 of a resistance measurement (ohmmeter) functional block 91. The ohmmeter 91 further has a second bias input 92 directly connected to the second power output terminal 66 of the power supply 64, a common input terminal 93 directly connected to the common conductor 52, a signal output 94 and a signal input 95.

The function select switch 26 (FIG. 1) is in the preferred embodiment a multi-layered wafer switch, having three layers. Referring to FIG. 2, these layers are generally designated at: a first layer 26(a); a second layer 26(b); and a third layer 26(c). Each of the three layers of the switch 26 includes four contacts, corresponding to the four function selector positions illustrated on the selector panel 12 of FIG. 1. Those contacts of like designation on each of the three layers are positionally aligned with one another on the three wafer levels. For simplicity, these four positions have been abbreviated as "+ DC," "− DC," "AC" and "Ohms." A movable wiper generally designated at w at each of the wafer layers of the switch 26 in FIG. 2, selectively engages the four contact switch positions on its respective layer. The three wipers move simultaneously with one another in response to movement of the function select knob (FIG. 1) of the switch 26; the unified movement is indicated by the dashed line connecting the three wiper arms in FIG. 2.

Referring to FIG. 2, the "Ohms," the "AC," and the "− DC" stationary contacts of the first layer 26(a) of the switch 26 are directly commonly connected to the common conductor 52. The "+ DC" stationary contact of the first layer 26(a) of the switch 26 is directly connected to the second signal output 86 of the ammeter circuits 81.

The second signal output 86 of the ammeter circuits 81 is also directly connected to the "− DC" stationary contact of the second layer 26(b) of the switch 26. The third signal output 87 of the ammeter circuits 81 is directly connected to the "AC" stationary contact of the second layer 26(b) of the switch 26. The "Ohms" and "+ DC" stationary contacts of the second layer 26(b) of the switch 26 are respectively connected to the signal output 94 of the ohmmeter circuits 91 and to the common conductor 52.

The "+ DC," "− DC" and "AC" stationary contacts of the third layer 26(c) of the switch 26 are commonly connected to the signal input 84 of the ammeter circuits 81. The "Ohms" stationary contact of the third layer 26(c) of the switch 26 is directly connected to the signal input 95 of the ohmmeter circuits 91.

The stylus 45(a) of the probe 45 is directly connected by means of a fuse 97 to the movable wiper w of the third layer 26(c) of the selector switch 26. The fuse 97 in the preferred embodiment is a 5 amp fuse which is physically enclosed within the fuse cavity 37 (FIG. 1) and protects the electrical circuits from high current surges picked up by the sensing probe 45 from surfaces probed thereby.

The movable wiper contact w of the first layer 26(a) of the selector switch 26 is directly connected to a first input terminal 100 of a meter movement 101 of the meter 15. The meter movement 101 further has a second input terminal 102 directly connected to the movable wiper w of the second level 26(b) of the selector switch 26. The meter movement 101 is operatively connected to accurately position the needle indicator 20 across the scales 16, 18 and 19 of the meter 15. In the preferred embodiment, the meter movement 101 is a 100 μamp movement.

Figure 3:
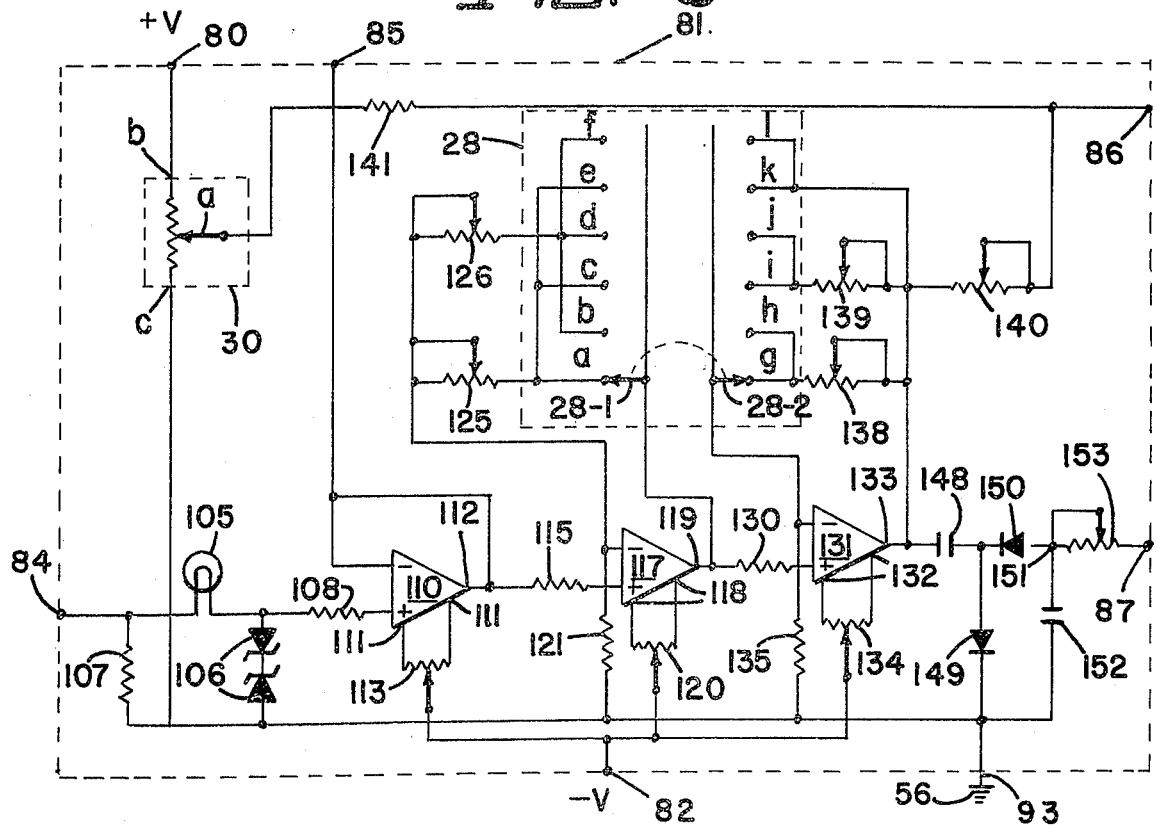
FIG. 3 is a schematic diagram representation of the current measurement portion of my invention, disclosed in FIG. 2.

The ammeter circuits 81 of the preferred embodiment are schematically illustrated in FIG. 3. Referring to FIG. 3, the signal input 84 is connected by means of a lamp 105 and a pair of back-to-back zener diodes 106 to the common input terminal 93 and is also connected by means of a resistor 107 to the common input terminal 93. The lamp 105 and zener diodes 106 in combination provide an energy dissipating function for current surges applied to the signal input 84. The input terminal 84 is also connected by means of the lamp 105 and a resistor 108 to a non-inverting (+) input of an operational amplifier 110. The amplifier 110 further has an inverting (−) input, a pair of bias inputs 111 and a signal output 112. A bias potentiometer 113 is connected across the bias input 111 of the amplifier 110. The movable wiper of the potentiometer 113 is connected to the V-bias input terminal 82.

In the preferred embodiment, all operational amplifiers employed are type 741 operational amplifiers, however other types of operational amplifiers could be employed without departing from the spirit and or intent of this invention. For the sake of clarity, it will be understood that each operational amplifier described has positive and negative bias inputs respectively connected to the V+ and V− supply lines (not illustrated).

The signal output 112 of the amplifier 110 is directly connected to the inverting (−) input of the amplifier. The inverting (−) input of the amplifier 110 is also directly connected to the first signal output 85 of the ammeter. The signal output 112 of the amplifier 110 is further connected by means of a resistor 115 to a non-inverting (+) input of an operational amplifier 117. The amplifier 117 further has an inverting (−) input, a pair of bias inputs 118 and a signal output 119.

A bias potentiometer 120 is connected across the bias inputs 118 of the amplifier 117. The movable wiper of the bias potentiometer 120 is directly connected to the V-input 82.

The inverting (−) input of the amplifier 117 is connected by means of a resistor 121 to the common input terminal 93.

The signal output 119 of the amplifier 117 is directly connected to a first movable wiper 28-1 of the range selector switch 28. The range selector switch 28 also has a second movable wiper 28-2 operatively simultaneously movable, in response to movement of the selector knob 28 (FIG. 1), with the first movable wiper 28-1; the simultaneous movement is illustrated by the dashed line (FIG. 3) connecting the two wipers. The first wiper arm 28-1 is selectively movable between six stationary contacts designated as 28(a) through 28(f) respectively. The second movable wiper arm 28-2 is simultaneously movable with the first wiper arm 28-1 between six stationary contacts labled 28(g) through 28(l) consecutively. For example, when the first wiper arm 28-1 is operatively engaging the stationary contact 28(c), the second wiper arm 28-2 will be in operative engagement with the stationary contact 28(i).

The stationary contacts 28(a), 28(c) and 28(e) of the switch 28 are connected by means of a potentiometer 125 to the inverting (−) input of the amplifier 117. The movable wiper of the potentiometer 125 is directly connected to the inverting (−) input of the amplifier 117. The stationary contacts 28(b), 28(d) and 28(f) of the switch 28 are connected by means of a potentiometer 126 to the inverting (−) input of the amplifier 117. The movable wiper of the potentiometer 126 is directly connected to the inverting (−) input of the amplifier 117 and also to the movable wiper of the potentiometer 125.

The signal output 119 of the amplifier 117 is connected by means of a resistor 130 to the non-inverting (+) input of an operational amplifier 131. The amplifier 131 further has an inverting (−) input, a pair of bias inputs 132 and a signal output 133. A bias potentiometer 134 is connected between the bias inputs 132 of the amplifier 131. The movable wiper of the bias potentiometer 134 is directly connected to the V-input terminal 82.

The inverting (−) input of the amplifier 131 is directly connected to the movable wiper arm 28-2 of the switch 28, and is also connected by means of a resistor 135 to the common input terminal 93.

The stationary contacts 28(g) and 28(h) are connected by means of a potentiometer 138 to the signal output 133 of the amplifier 131. The signal output 133 of the amplifier 131 is also directly connected to the stationary contacts 28(k) and 28(l) of the switch 28, and is further connected by means of a potentiometer 139 to the stationary contact 28(i) and 28(j) of the switch 28. The signal output 133 of the amplifier 131 is directly connected to the wiper arm of the potentiometers 138 and 139.

The signal output 133 of the amplifier 131 is also connected by means of a potentiometer 140 to the second signal output 86 of the ammeter 81. The movable wiper arm of the potentiometer 140 is directly connected to the second signal output 86. The signal output 86 is also connected by means of a resistor 141 to a movable wiper arm 30(a) of the potentiometer 30. The potentiometer 30 also has a first terminal 30(b) directly connected to the V+ bias input 80, and a second terminal 30(c) of the potentiometer is directly connected to the common input terminal 93. The potentiometer 30 is that electrical device associated with the "dc zero" knob of FIG. 1.

The signal output 133 of the amplifier 131 is connected by means of a capacitor 148 in series with a diode 149 to the common input terminal 93. The signal output 133 of the amplifier 131 is also connected by means of the capacitor 148 and a back-biased diode 150 to a junction 151. The junction 151 is connected by means of a capacitor 152 to the common terminal 93 and is also connected by means of a potentiometer 153 to the third signal output 87 of the ammeter 81. The movable wiper arm of the potentiometer 153 is directly connected to the junction 151.

Figure 4:
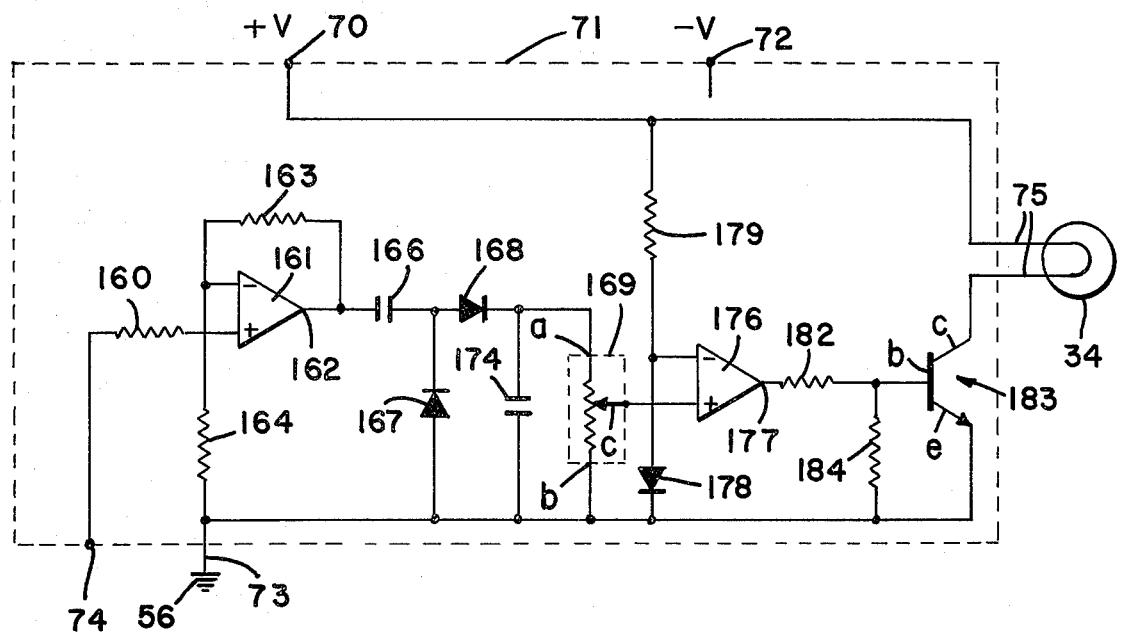
FIG. 4 is a schematic diagram representation of the hazard indicator portion of my invention, as disclosed in FIG. 2.

The hazard detector functional block 71 is schematically represented in more detail in FIG. 4. Referring to FIG. 4, the signal input 74 of the hazard detector 71 is connected by means of a resistor 160 to a non-inverting (+) input of an operational amplifier 161. The amplifier 161 further has an inverting (−) input and a signal output 162. As previously discussed, the bias connections of the operational amplifiers within the hazard detector 71, to the V+ (70) and to the V− (72) input terminals will be understood to be present although not illustrated.

The signal output 162 of the amplifier 161 is connected by means of a feedback resistor 163 to the inverting (−) input of the amplifier 161. The inverting (−) input of the amplifier 161 is also connected by means of a resistor 164 to the common input terminal 73 of the detector.

The signal output 162 of the amplifier 161 is also connected by means of a capacitor 166 and through a back-biased diode 167 to the common input terminal 73 of the detector. The signal output 162 of the amplifier 161 is further connected by means of the capacitor 166 and a diode 168 to a first terminal 169(a) of a potentiometer 169.

The potentiometer 169 further has a second terminal 169(b) directly connected to the common input terminal 73 of the detector and a wiper arm 169(c). The first terminal 169(a) of the potentiometer 169 is also connected by means of a capacitor 174 to the common terminal 73 of the detector. The wiper arm 169(c) of the potentiometer 169 is directly connected to a non-inverting (+) input of an operational amplifier 176.

The amplifier 176 further has an inverting (−) input and a signal output 177. The inverting (−) input of the amplifier 176 is connected by means of a diode 178 to the common input terminal 73 of the detector and is also connected by means of a resistor 179 to the V+ input terminal 70 of the detector.

The signal output 177 of the amplifier 176 is connected by means of a resistor 182 to the base (b) of an NPN transistor 183. The transistor 183 further has an emitter (e) directly connected to the common input terminal 73 of the detector and a collector (c). The base (b) of the transistor 183 is also connected by means of a resistor 184 to the common input terminal 73. The collector (c) of the transistor 183 is directly connected to a first of the indicator output terminals 75 leading to the hazard indicator lamp 34. The second of the indicator output terminals 75 leading to the hazard indicator lamp 34 is directly connected to the V+ bias input 70.

Figure 5:
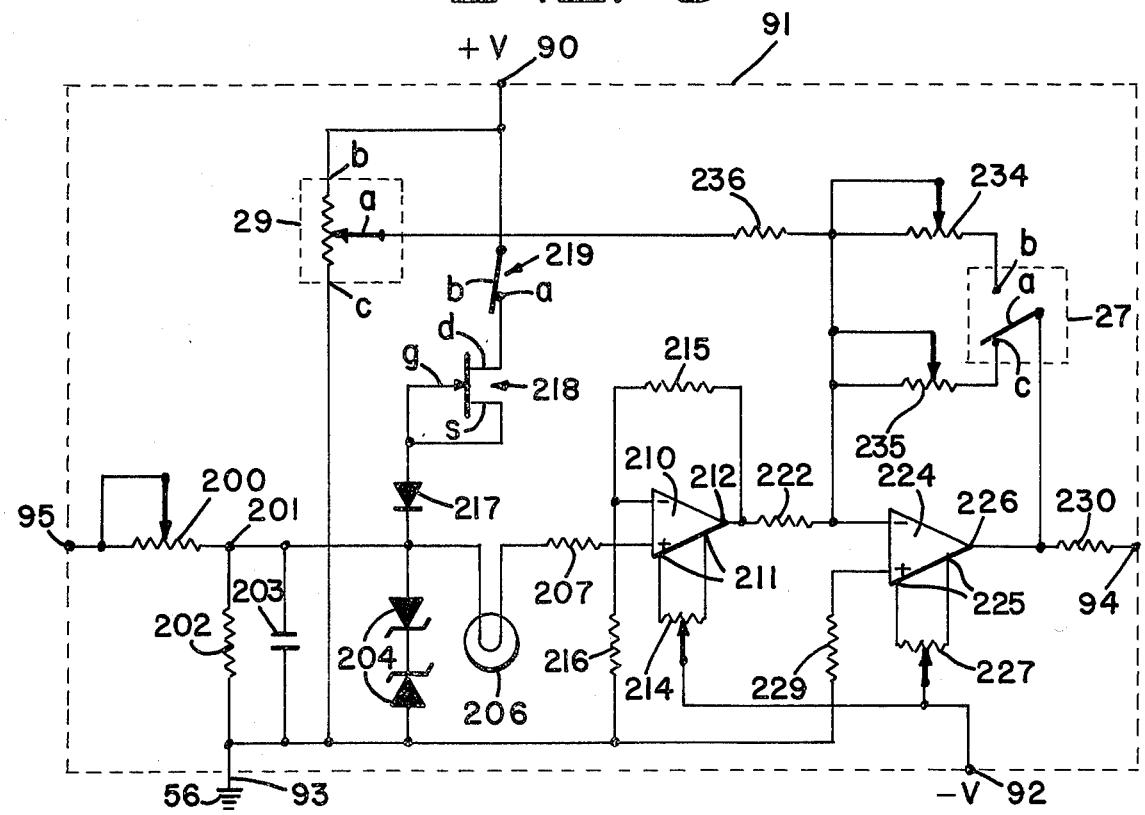
FIG. 5 is a schematic diagram representation of the resistance measurement portion of my invention, as disclosed in FIG. 2.

The ohmmeter circuits 91 of the preferred embodiment are schematically represented in more detail in FIG. 5. Referring to FIG. 5, the signal input 95 of the ohmmeter 91 is connected by means of a potentiometer 200 to a junction 201. The wiper arm of the potentiometer is directly connected to the signal input 95. A resistor 202, a capacitor 203 and a pair of back-to-back zener diodes 204 are connected in parallel and join the junction 201 to the common terminal 93 of the ohmmeter. The junction 201 is also connected by means of a lamp 206 in series with a resistor 207 to a non-inverting (+) input of an operational amplifier 210.

The amplifier 210 further has an inverting (−) input, a pair of bias inputs 211 and a signal output 212. A bias potentiometer 214 is connected between the bias inputs 211 of the amplifier 210. The wiper arm of the potentiometer 214 is directly connected to the V− bias input 92. The signal output 212 of the amplifier 210 is connected by means of a feedback resistor 215 to the inverting (−) input of the amplifier 210. The inverting (−) input of the amplifier 210 is also connected by means of a resistor 216 to the common input terminal 93 of the ohmmeter.

The junction 201 is further connected by means of a back-biased diode 217 to a gate (g) of an n-channel field effect transistor 218. The field effect transistor 218 further has a drain (d) and a source (s). The source (s) of the transistor 218 is directly connected to its gate (g).

The drain (d) of the transistor 218 is connected to a stationary contact 219(a) of a switch 219. The switch 219 further has a movable contact 219(b) directly connected to the V+ bias input terminal 90 of the ohmmeter 91.

The signal output 212 of the amplifier 210 is also connected by means of a resistor 222 to the inverting (−) input of an operational amplifier 224. The amplifier 224 further has a non-inverting (+) input, a pair of bias inputs 225 and a signal output 226. A bias potentiometer 227 is connected between the bias inputs 225 of the amplifier 224. The movable wiper of the potentiometer 227 is directly connected to the V-bias input terminal 92 of the ohmmeter.

The non-inverting (+) input of the amplifier 224 is connected by means of a resistor 229 to the common input terminal 93. The signal output 226 of the amplifier 224 is connected by means of a resistor 230 to the signal output 94 of the ohmmeter 91, and is also directly connected to a movable wiper 27(a) of the ohm range select switch 27. The switch 27 further has a first stationary contact 27(b) and a second stationary contact 27(c), corresponding to the low and high range selector positions respectively illustrated in FIG. 1.

The first stationary contact 27(b) of the switch 27 is connected by means of a potentiometer 234 to the inverting (−) input of the amplifier 224. The second stationary contact 27(c) of the switch 27 is connected by means of a potentiometer 235 to the inverting (−) input of the amplifier 224. The movable wipers of both the potentiometers 234 and 235 are directly connected to the inverting (−) input of the amplifier 224.

The inverting (−) input of the amplifier 224 is also connected by means of a resistor 236 to a movable wiper arm 29(a) of the potentiometer 29. The potentiometer 29 also has a first terminal 29(b) directly connected to the V+ bias input terminal 90, and a second terminal 29(c) directly connected to the common input terminal 93. The potentiometer 29 corresponds to the "Ohm zero" selector knob (FIG. 1).

OPERATION OF THE PREFERRED EMBODIMENT

The test instrument of this invention is particularly designed to measure electrical parameters within an ESPL which may create a hazardous condition to an electrically susceptible patient in the ESPL. The instrument measures current flow through a simulated electrically susceptible patient, from a probed conductive surface within the ESPL to the patient ground, and provides a visual warning when such measured current exceeds the microshock hazard level. The instrument also measures the electrical resistance between any conductive surface in the ESPL and the patient ground by using current levels which are not hazardous to an electrically susceptible patient within ESPL. The instrument is particularly adapted for measuring the resistance between equipment ground receptacles and the patient ground (i.e., "ground integrity").

The basic operation of the ESPL test instrument of this invention may be described with reference to FIGS. 1 and 2. Referring to FIG. 1, the instrument is energized and de-energized by means of the power switch 25, operative respectively between its On and Off positions. Once energized, the instrument is selectively operable to measure one of the four parameters selected by the function select switch 26. The instrument measures that parameter selected by the function select switch 26 and provides an indication of the value of that parameter on its meter 15.

A parameter measurement is made by touching the stylus 45(a) of the probe 45 to that surface being monitored. When the function selector 26 is positioned to any of the microamp selector positions [+ DC, − DC, AC], the instrument measures current flow from the contacted surface, through the probe 45 and the 500 ohm resistor 107 to the patient ground 56. The current flow may be read-out upon the appropriate scale of the meter 15. When the switch 26 is positioned to the (+ DC) scale, the instrument measures DC current which is registered upon the upper scale 16 of the meter and indicates that the probe 45 has detected a positive polarity with respect to patient ground on the contacted surface. When the switch 26 is positioned to select the (− DC) position, the instrument measures DC current which may be read from the upper scale 16, and indicates that the probe 45 has detected a negative polarity with respect to the patient ground 56. When the switch 26 is positioned to the (AC) position, the instrument measures AC current in microamps through the resistor 107 which may be read from the upper scale 16. When the function select switch 26 is positioned to the (Ohms) position, the instrument measures DC resistance of the probed object, between the stylus 45(a) of the probe 45 and the patient ground 56; the resistive value may be read from either the first or the second lower scales 18 and 19 respectively of the meter 15.

The "ohms range" selector 27 determines upon which of the scales 18 or 19 the resistance value should be read when making a resistance measurement, (i.e., when the function select indicator 26 is positioned in its "Ohms" measurement position). When the "ohms range" selector 27 is positioned to indicate the LOW position, the instrument indicates (by means of the indicator needle 20) the correct resistance reading upon the second lower scale 19. When the "ohms range" selector 27 is positioned to indicate its HIGH position, the correct resistive measurement is indicated upon the first lower scale 18.

The "microamp range selector" switch 28 is used by a user to select the desired measurement range of the meter 15 whenever the instrument is operative in either the +DC, −DC or AC measurement modes. The numerical designations associated with the "microamp range selector" 28 (illustrated adjacent to the six positions of the microamp range selector 28 — FIG. 1) represent the full scale meter deflection upon the upper scale 16 of the meter 15. The left-most position of the scales 16, 18 and 19 indicates the "zero" current or "zero" ohm position, and the scales are graduated in the increasing microamp and ohm readings from left to right.

The "ohm zero" and "DC zero" selectors 29 and 30 respectively provide for calibration adjustment "zeroing" of the resistance measurement scales (18, 19) and of the current measuring scale (16) respectively, prior to an actual test measurement.

The power lamp 35 is illuminated when the power switch 25 is operatively positioned in its On position. The hazard lamp 34 is automatically illuminated whenever a measured AC current exceeds 10 microamps in magnitude [i.e., the microshock hazard level].

A more detailed description of the operation of the circuits within the test instrument is made with reference to FIGS. 2-5. Referring thereto, when the power switch 25 is closed, the power supply 64 is energized from the AC power lines 53 and 54 and supplies (+ 12) volt and (− 12) volt signals respectively at its outputs 65 and 66. These supply voltages are used to energize the circuits within the hazard detector 71, the current measurement 81 and the ohmmeter 91 portions of the circuit.

When the function select switch 26 is positioned to either the +DC, the −DC or the AC microamp positions, a signal measured by means of the probe 45 is directly applied to the signal input 84 of the current measurement block 81. In any one of these those functional modes, the ohmmeter portion 91 of the instrument is not operatively connected. The only functional difference between a +DC and a −DC measurement by the instrument is the operative [polarity] connection of the meter 15 within the circuit, as indicated by the first and second layer positions 26(a) and 26(b) of the switch 26 respectively (see FIG. 2).

When functionally operative in the +DC, the −DC or the AC microamp modes, the ammeter portion 81 of the instrument provides a conductive path from that surface touched by the stylus 45(a) of the probe 45 as follows: from the surface, through the probe 45, through the wiper of the third layer 26(c) of the switch 26, through the signal input 84 of the ammeter 81, and through the 500 ohm resistor 107 and the common terminal 93 of the ammeter to the patient ground 56. Any voltage (potential) on a surface probed by the probe 45 causes current to flow along the aforementioned path through the resistor 107 and also applies that "surface potential" to the non-inverting input (+) of the amplifier 110. Since the input impedance of the amplifier 110 is extremely high, current flow through its non-inverting (+) input is negligible and the level of any voltage signal presented at its non-inverting (+) input is essentially identical to the actually measured "surface voltage." The 500 ohm resistance 107 represents that minimum resistive value of an electrically susceptible patient. Therefore, measurement of current flow through the resistor 107 enables an accurate determination of microshock hazardous conditions to be made. The ammeter 81 is operative to determine the current flow through the resistor 107 by accurately measuring the voltage drop across that resistor created by the current flow therethrough. The unique operational amplifier arrangement employed enables extremely accurate and error-free current readings to be made.

The feedback path of the amplifier 110 causes the amplifier 110 to act as a non-inverting unity gain amplifier, which simultaneously applies the measured input potential to the signal input 74 of the hazard detector 71 and to the non-inverting (+) input of the amplifier 110. The first amplifier stage 110 acts as a power amplification and isolation stage between the signal input 84 and the critical parameter measurement circuits of the ammeter and of the hazard detector, to be hereinafter described.

The pair of amplifiers 117 and 131 enable selective gain measurements to be made by means of the plurality of feedback paths provided for these amplifiers by the range selector switch 28. The feedback resistors 125, 126, 138 and 139 of the amplifiers 117 and 131 are preset during calibration of the instrument to provide full scale deflection upon the scale 16 of the meter 15 according to the indicated range position of the selector knob 28, (FIG. 1). The six contact pair positions of the switch 28 (as illustrated from bottom to top in FIG. 3) correspond respectively to the six selector positions for switch 28 (from 10 to 5,000) on the instrument panel (FIG. 1). By way of example, when the selector switch 28 is positioned at the 50 microamp position, the wiper arms 28-1 and 28-2 will respectively engage the 28(b) and 28(h) stationary contacts (FIG. 3), thus placing the resistors 126 and 138 respectively as the feedback resistors for the amplifiers 117 and 131.

The instrument is pre-calibrated to provide full scale deflection upon the upper scale 16 (FIG. 1) for each of the six selective settings of the range selector switch 28. The signal applied to the non-inverting (+) input of the amplifier 117 is amplified by its selected gain factor and is thereafter applied to the non-inverting (+) input of the amplifier 131. Amplifier 131 amplified its received signal by its selected gain factor and provides the "twice" amplified signal at its output 133. When operative in either the +DC or −DC modes, this signal is applied through the potentiometer 140 to the meter 15 by means of the signal output 86 of the ammeter. The appropriate measured current reading may be read from the upper scale 16, with the range selection provided by the range select switch 28.

The dual amplification properties of the ammeter provided by the two amplification stages 117 and 131, in cooperation with their unique feed-back switching arrangement for simultaneously selectively switching pairs of feed-back resistors for the amplifiers, allows the gain settings of the amplifiers 117 and 131 to be cross-checked against one another during calibration through progressive dependent adjustments; this procedure insures error-free and accurate readings on the scale 16 of the meter 15 for all six microamp range selections.

The "DC zero" potentiometer 30 enables bias adjustment of the meter 15 from the V+ supply, through the signal output 86 of the ammeter 81, for zeroing the indicator needle 20 of the meter 15 prior to a measurement.

A microshock hazard condition (predetermined to be a voltage potential condition existing at a conductive surface in the ESPL which may cause a current flow of 10 microamps through 500 ohms) is truly defined with respect to AC current only. An AC measurement is made by placing the function select switch 26 in the AC position, which connects the meter 15 to the test circuits with the same polarities as for the −DC testing mode. When operative in the AC testing mode, the hazard detector portion of the circuit 71 becomes automatically operative to provide an alarm indication through energization of the hazard indicator lamp 34, whenever a hazardous AC microshock current flows through the resistor 107. The hazard detector 71 receives the power amplified signal from the amplifier 110, by means of the signal input 74 (FIG. 4). The received signal is applied to the non-inverting (+) input of the amplifier 161 by means of the resistor 160. The amplifier 161 amplifies the received signal by its amplification factor and passes the amplified signal to the voltage doubler circuit, comprising the capacitors 166 and 174 and the diodes 167 and 168. The voltage doubling circuit acts only in response to an AC signal to provide a "doubled" voltage signal to the resistor 169.

The amplifier 176 is operatively connected as a comparator amplifier and provides a positive voltage signal at its output 177 whenever the voltage level applied to its non-inverting (+) input exceeds the reference voltage established across the diode 178 at its inverting (−) input. The wiper 169(c) of the potentiometer 169 is pre-set during calibration of the circuit to provide a triggering signal to the non-inverting (+) input of the amplifier 176 whenever the voltage level of the signal applied to the signal input 74 of the hazard detector 71 is 5 millivolts (i.e., representing a current flow of greater than 10 microamps through the resistor 107).

The output transistor 183 of the hazard detector acts as a switch to energize the hazard indicator lamp 34 when driven into saturation by means of a positive output signal from the comparator amplifier 176. Therefore, whenever a measured AC signal causes current flow through resistor 107 which exceeds ten microamps, the hazard indicator lamp 34 will be automatically energized through the aforementioned process to indicate a micro-shock hazardous condition existing at the probed surface.

An accurate reading of the actual AC current potentially available between the probed surface and the patient ground is provided by the meter 15 and may be read-out on the upper scale 16 thereof. The same ammeter circuits previously described with respect to the DC measurement conditions are employed to provide the "twice" amplified signal to the signal output 133 of the amplifier 131. The AC signal appearing at the signal output 133 is doubled in voltage and demodulated by means of that circuit formed by the capacitors 148 and 152, the diodes 149 and 150 and the potentiometer 153. The amplified, doubled, and demodulated voltage level thus produced is applied to the meter 15 by means of the signal output 87 of the ammeter and the AC contact and wiper of the second layer 26(b) of the switch 26. The "range select" indicator 28 provides the same range selection capabilities for selecting the desired microamp range from the scale 16, as previously described with respect to the DC measurement techniques.

When continuous monitoring of apparatus within the ESPL is required while an electrically susceptible patient is within that room, it is the AC mode of operation of the instrument which would be used to continuously monitor questionable pieces of equipment or surfaces, etc.

When the "function select" indicator 26 is positioned to "Ohms" the ohmmeter portion of the circuit 91 is operatively connected to the meter 15 at the exclusion of the ammeter 81 and the hazard indicator 71 circuits, and the instrument is operable in its resistance measuring capacity. The ohmmeter 91 is uniquely operable to measure very small resistance values between the probe 45 and the patient ground 56 by using current levels that are non-hazardous to an electrically susceptible patient within the ESPL. The ohmmeter is particularly amenable to measuring "ground integrity" (i.e., the electrical resistance between a ground terminal of a receptacle plug and the patient ground 56). Resistance values of less than 0.1 ohms can accurately be measured by the ohmmeter circuits 91 at current levels safe to the electrically susceptible patient.

Referring to FIG. 5, the field effect transistor 218 and the diode 217 act as a current source, providing current flow from the V+ bias input 90 to the junction 201. In the preferred embodiment, the resistor 202 is a precision 1 ohm resistor and the potentiometer 200 is adjusted to provide a combined resistance with the probe 45 and its connecting conductor (cord) 46 of 0.1 ohms. The current source, in the preferred embodiment, supplies a current of 4.5 milliamps to the junction 201. Therefore, when the probe 45 is not in electrical contact with a conducting surface, all of the current flow provided by the current source passes through the 1 ohm resistor 202 to the patient ground 56 and establishes a voltage potential of 4.5 millivolts at the junction 201. The zener diodes 204 are overvoltage protection diodes having zener breakdown reference levels sufficiently higher than this established 4.5 millivolt level, and do not provide a current flow path for the current from the current source under normal operating conditions. Further, the input impedance of the operational amplifier 210 is sufficiently high, so as to make any current flow into the non-inverting (+) input of the amplifier 210 negligible.

The potentiometer 200 and the resistor 202, therefore, are connected in parallel between the junction 201 and the patient ground 56, whenever the probe 45 is touched to a conducting object which would complete a current flow path through the probed object to the patient ground 56. As above discussed, the resistive value of the potentiometer 200 is adjusted to provide an effective resistance of 0.1 ohms between the junction 201 and the stylus 45(a) of the probe 45. Therefore, when the probe 45 makes electrical contact with the patient ground 56, most of the current provided by the current source will flow through the potentiometer 200 and probe 45 to the patient ground, rather than through the higher resistive path (1 ohm) presented by the resistor 202 (according to Ohm's Law).

The voltage level produced at the junction 201 as a result of the current flow through the parallel combination of the resistor 202 and through the potentiometer 200 and probe 45 is sensed by means of the operational amplifier 210. The amplifier 210 amplifies the sensed voltage from the junction 201 by its amplification factor and applies the amplified signal to the inverting (−) input of the amplifier 224. The amplifier 224 further amplifies the signal applied to its inverting (−) input by the amplification factor established by the selected feedback resistor (234 or 235), as determined by the "ohms range" selector switch 27 (FIG. 1). The "twice" amplified signal appearing at the signal output 226 of the amplifier 224 is applied to the meter 15 by means of the signal output 94 of the ohmmeter 91 through the second layer 26(b) of the function select switch 26. The meter reading is initially "nulled" by means of the "ohm zero" potentiometer 29 so as to record a "zero" ohm reading whenever the probe 45 is in direct electrical contact with the patient ground 56. By thus providing the input circuit to the ohmmeter with a variable but known resistance, accurate resistance measurements can thereafter be made independent of the actual probe and connecting cord resistance.

When the probe 45 is placed in electrical contact with a conductive surface (other than the patient ground 56), within the ESPL, the resistive path between the junction 201 and patient ground 56 through the probe 45 is increased by the added electrical resistance, represented by the electrical resistance of the conductive surface, between the probe stylus 45(a) and the patient ground 56. Accordingly, any increase in resistance between the probe stylus 45(a) and the patient ground 56 causes a greater percentage of the current delivered by the current source to flow through the 1 ohm resistor 202, thus causing a proportionate increase in the voltage level appearing at the junction 201. Any such change in the voltage appearing at the junction 201 is accurately detected and amplified by means of the operational amplifiers 210 and 224, providing an accurate read-out thereof upon the appropriate scale (18 or 19) of the meter 15. When the "ohms range" selector switch 27 is positioned at its "Low" position, the feedback resistance represented by the potentiometer 234 is operatively connected within the circuit, and the read-out is made upon the second lower scale 19 of the meter. When the switch 27 is positioned to its "High" position, the feedback resistance represented by the potentiometer 235 is operatively connected within the circuit and the resistance value may be read-out from the first lower scale 18 of the meter 15.

A significant feature of the apparatus employed to measure resistance (by the ohmmeter circuit 91) is the fact that the voltage level at the junction 201 never exceeds 4.5 millivolts. Therefore, should the probe 45 contact an electrically susceptible patient having the minimal resistance of 500 ohms, the current flow through that electrically susceptible patient would be below the lethal microshock hazard level (10 microamps). This factor results from the fact that under such conditions, the effective resistance (including the electrically susceptible patient resistance) of the probe-leg current path from the junction 201 to the patient ground is much larger than the constant 1 ohm resistive path from the junction 201 provided by the resistor 202. Therefore, the ohmmeter measurements are completely safe to an electrically susceptible patient within the ESPL, and can be safely, continuously and accurately made in his immediate presence.

While I have disclosed a specific embodiment of my invention, it is to be understood that this is for the purpose of illustration only, and that my invention is to be limited solely by the scope of the appended claims.

What is claimed is:

1. An electronic test instrument for measuring electrical parameters within an electrically susceptible patient location (ESPL), said ESPL having a patient ground and a plurality of electrically conductive surfaces therein, comprising:
   a. a chassis;
   b. probe means connected to and operatively extendable from said chassis to each of said conductive surfaces for sensing electrical parametric conditions of said surfaces when in electrical contact therewith; and
   c. electronic circuit means mounted to said chassis for measuring and for determining hazardous electrical conditions within said ESPL, said circuit means comprising:
      i. a signal input operatively connected with said probe means for receiving said sensed electrical conditions therefrom;
      ii. reference means operatively connecting circuits within said electronic circuit means with said patient ground for electrically referencing the circuits thereto;
      iii. current measurement means operatively connected with said signal input to receive said sensed electrical conditions therefrom, for measuring electrical current flow potentially available through an electrically susceptible patient from said conductive surface probed by said probe means to said patient ground;
      iv. hazard detector means operatively connected with said current measurement means for providing a warning output signal when the magnitude of said measured electrical current flow exceeds a predetermined microshock hazard level; and
      v. resistance measurement means in circuit with said signal input for measuring the electrical resistance between said patient ground and any of said electrically conductive surfaces operatively contacted by said probe means, by causing current flow through that conductive surface in contact with said probe means to said patient ground, and by analyzing electrical characteristics of such caused current flow, said resistance measurement means further having means for variably limiting the magnitude of said caused current to levels predetermined as nonhazardous to an electrically susceptible patient within the ESPL.

2. An electrical test instrument according to claim 1, wherein said chassis defines an internal cavity for enclosedly retaining said probe means when not in operative use; and wherein said probe means comprises:
   a. a single electrical probe suitable for making electrical contact with said conductive surfaces; and
   b. conductor means for electrically connecting said probe with said signal input of said electronic circuit means, said conductor means being of circuit means, said conductor means being of sufficient length to enable said probe to operatively contact all of said conductive surfaces within said ESPL.

3. An electronic test instrument according to claim 1, wherein said current measurement means comprises:
   a. resistor circuit means operatively connected between said signal input and said patient ground for providing an electrical path therebetween, said resistor circuit means having an equivalent resistive value between said signal input and said patient ground simulating a minimum electrical resistance of an electrically susceptible patient; and
   b. operational amplifier means operatively connected with said resistor circuit means for sensing the magnitude of current flow therethrough and for providing an output signal that varies proportionately with the magnitude of said sensed current flow.

4. An electronic test instrument according to claim 3, wherein said current measurement means, further comprises:
   a. read-out means operatively connected to receive said output signal of said operational amplifier means for providing a visual quantitative readout thereof; and
   b. selector means operatively connected with said operational amplifier means for providing said read-out means with variable range sensitivity.

5. An electronic test instrument according to claim 3, wherein said operational amplifier means comprises first and second operational amplifier circuits electrically serially connected for amplifying said sensed current flow signal through said resistor circuit means, and variable gain selector means operatively connected to simultaneously selectively vary the gain of both said first and second operational amplifier circuits for providing accurate cross-checking of their respective individual operations.

6. An electronic test instrument according to claim 3, wherein said hazard detector means comprises:
   a. operational amplifier means operatively connected with said resistor circuit means of said current measurement means for sensing the magnitude of AC current flow therethrough and for providing a first output signal whenever the magnitude of said sensed AC signal is less than said predetermined microshock hazard level and for providing said warning output signal whenever the magnitude of said sensed AC signal exceeds said predetermined microshock hazard level; and
   b. warning means operatively connected to receive said first output and said warning output signals for providing a sensory warning indication within the ESPL whenever said warning output signal is received thereby.

7. An electronic test instrument according to claim 1, wherein said ESPL has at least one wall into which said patient ground extends, wherein a portion of said chassis is configured for mounting within said one wall, wherein said reference means extends within said one wall for operatively connecting the circuits within said electronic circuit means to that portion of said patient ground extending therein, wherein said chassis includes a control panel forming one surface thereof and configured for substantially flush mounting with the surface of said one wall, and wherein said probe means is operatively connected to extend from said control panel.

8. An electronic test instrument according to claim 1, wherein said resistance measurement means comprises:
   a. current source means having an output, for supplying a flow of current having constant predetermined magnitude from its said output whenever an electrical return path is connected between its said output and said patient ground;
   b. electrical return path means operatively connecting said current source means outut with said signal input and with said patient ground for causing a controlled portion of the current flowing from said current source means output to flow through and out of said probe means whenever said probe means operatively contacts one of said conductive surfaces, said electrical return path means including said means for variably limiting said caused controlled current flow directed out of said probe means to a magnitude not exceeding said non-hazardous current level;
   c. means operatively connected with said electrical return path means for sensing the magnitude of said caused current flowing out of said probe means and for providing an output signal proportional thereto; and
   d. indicator means operatively connected to receive said last named output signal for providing in response thereto a visual indication accurately displaying the magnitude of that electrical resistance of the electrical return path between said probe means and said patient ground and external of said electronic test instrument.

9. An electronic test instrument according to claim 8, wherein said electrical return path means comprises:
   a. first electrical path means operatively connecting said constant current source output with said patient ground for providing a current flow path therebetween having a known predetermined resistive value; and
   b. second electrical path means operatively connecting said signal input with said constant current source output for providing a second current flow path for said current flowing from said current source means output whenever said probe means is in operative electrical contact with one of said conductive surfaces, and for cooperating with said first electrical path means to controllingly divide said constant current flow therebetween responsive to the electrical resistance of said second electrical path means and to limit the level of current flow through said second electrical path means to said non-hazardous current level.

10. An improved electronic ohmmeter for measuring the electrical resistance between a patient ground bus and a second ground terminal conductor extending from and in direct electrical contact with said patient ground bus within an electrically susceptible patient location (ESPL), comprising:
   a. current source means electrically referenced to said patient ground bus and having an output, for providing constant current flow from said output whenever an electrical return path is connected between said output and said patient ground bus;
   b. first electrical path means operatively connecting said constant current source output with said patient ground bus for providing a first electrical return path therebetween, said first electrical path means being of predetermined electrical resistance;
   c. probe input means operatively connected to said constant current source output and adapted for operatively electrically contacting said second ground terminal conductor for providing therewith a second electrical return path for said current flow from said current source output whenever said probe input means in in operative electrical contact with said second ground terminal conductor, said first electrical path means and said probe input means being cooperatively operable to proportion said constant current flow therebetween as a function of their respective equivalent resistive values as measured between said constant current source output and said patient ground bus, and proportioned such that the maximum level of that portion of said constant current which flows out of said probe input means is of a magnitude predetermined to be non-hazardous to an electrically susceptible patient within the ESPL;

d. voltage sensing means connected to continuously monitor the voltage level at said constant current source means output for providing a sensed output signal varying in response thereto;

e. operational amplifier circuit means operatively connected to receive said sensed output signal for providing an amplified output signal the amplitude of which varies proportionately with said sensed output signal; and f. indicator means operatively connected to receive said amplified output signal for providing a visual indication responsive thereto, accurately representing the electrical resistance of that part of said second electrical return path located external of said ohmmeter and between said probe input means and said patient ground bus.

11. An improved electronic ohmmeter according to claim 9, wherein said operational amplifier circuit means includes means for adjusting the gain of said operation amplifier circuit means to correctively compensate said amplified output signal for causing said indicator means to accurately represent said electrical resistance of that said part of the second electrical return path located external of the ohmmeter, regardless of the electrical resistance of said probe input means.

12. An improved electronic ohmmeter according to claim 10, wherein said probe input means comprises:

a. a single electrical probe suitable for making electrical contact with said second ground terminal conductor; and b. variable resistance means operatively serially connecting said electrical probe with said constant current source means output for providing an electrical path of presettable resistive value therebetween.

13. An improved electronic ohmmeter according to claim 12, including circuit protection means operatively connected with said probe input means for protecting said operational amplifier circuit means from large voltage levels and spikes applied to said probe input means.

14. An improved electronic ohmmeter according to claim 13, wherein said circuit protection means includes:

a. fuse means electrically connected in series between said electrical probe and said patient ground bus for opening the electrical path between said electrical probe and said operational amplifier circuit means whenever a current of predetermined magnitude and duration flows therethrough; and b. variable energy dissipating means connected in series between said variable resistance means and said operational amplifier circuit means for preventing the application of current surges in said sensed output signal to said operational amplifier circuit means.

* * * * *